US012322922B2

United States Patent
Williams

(10) Patent No.: US 12,322,922 B2
(45) Date of Patent: Jun. 3, 2025

(54) MITIGATING STIMULATED BRILLOUIN SCATTERING IN HIGH POWER OPTICAL AMPLIFIER SYSTEM

(71) Applicant: II-VI Delaware, Inc, Wilmington, DE (US)

(72) Inventor: Martin R. Williams, Big Flats, NY (US)

(73) Assignee: II-VI DELAWARE, INC., Wilmington, DE (US)

( * ) Notice: Subject to any disclaimer, the term of this patent is extended or adjusted under 35 U.S.C. 154(b) by 968 days.

(21) Appl. No.: 17/337,366

(22) Filed: Jun. 2, 2021

(65) Prior Publication Data

US 2022/0393423 A1 Dec. 8, 2022

(51) Int. Cl.
  *H01S 3/13* (2006.01)
  *H01S 3/067* (2006.01)
(52) U.S. Cl.
  CPC ...... *H01S 3/13013* (2019.08); *H01S 3/06754* (2013.01); *H01S 3/1305* (2013.01); *H01S 2301/03* (2013.01)
(58) Field of Classification Search
  None
  See application file for complete search history.

(56) References Cited

U.S. PATENT DOCUMENTS

| 8,717,670 | B2* | 5/2014 | Starodoumov | H01S 3/1302 |
| | | | | 359/341.1 |
| 9,515,451 | B2* | 12/2016 | Zayhowski | H01S 3/1003 |
| 2011/0142084 | A1* | 6/2011 | Reid | H01S 5/4006 |
| | | | | 372/20 |
| 2019/0009369 | A1 | 1/2019 | Vorontsov | |
| 2020/0306880 | A1 | 10/2020 | Vorontsov et al. | |
| 2020/0373728 | A1* | 11/2020 | Benedick | H01S 3/0064 |
| 2021/0351559 | A1* | 11/2021 | Langseth | H01S 3/1307 |

OTHER PUBLICATIONS

Bowers, et al., Stimulated Brillouin Scattering in Optical Fibers With End Reflections Excited by Broadband Pump Waves, Optical Engineering, 2019, 58:10:102702-13.

* cited by examiner

*Primary Examiner* — Eric L Bolda
(74) *Attorney, Agent, or Firm* — Blank Rome LLP

(57) ABSTRACT

A system has fiber amplifiers that amplify a seed signal into a high power signal. Control circuity drives the fiber amplifiers. An auxiliary broad-linewidth signal can be selectively introduced to mitigate the onset of Stimulated Brillouin Scattering (SBS) when the primary input seed source does not meet the requirements of power and/or linewidth. To determine whether to mitigate SBS, an input photodiode can detect the seed signal, and the control circuity can detect an operational parameter associated with a detected signal indicative of an onset of SBS on the optical path. In response to the detection, the control circuitry introduces an auxiliary broad-linewidth signal from a broad-linewidth source, which can mitigate the onset of SBS on the optical path.

23 Claims, 3 Drawing Sheets

MITIGATING STIMULATED BRILLOUIN SCATTERING IN HIGH POWER OPTICAL AMPLIFIER SYSTEM

BACKGROUND OF THE DISCLOSURE

Stimulated Brillouin Scattering (SBS) is a deleterious, non-linear process that can be problematic for high power amplifiers and lasers. SBS is caused when the linewidth of the signal is too narrow for the combination of output power density and fiber length in a system. In extreme cases, SBS can cause catastrophic damage to the amplifier/laser.

For example, SBS can occur when narrow-band optical signals in a fiber amplifier are simply propagated through a passive fiber. SBS occurs when a certain power threshold has been reached, and most of the power of an incident beam in the fiber can be reflected. Nevertheless, to maximize output power, current amplifiers push operational limits right to the boundary of the onset of SBS.

Currently, it is believed that only reactive measures are used in systems to deal with the issue of SBS. In these techniques, the onset of SBS (backward traveling light at the input of the final amplification state) is detected, and the pump power is then turned down in response to the detection. As expected, such a reactive technique has a slow response due to all the energy stored in the fiber and due to the physical limitations in quickly shutting down the high current pump drives of the system.

The subject matter of the present disclosure is directed to overcoming, or at least reducing the effects of, one or more of the problems set forth above.

SUMMARY OF THE DISCLOSURE

A method disclosed herein is used to mitigate Stimulated Brillouin Scattering (SBS) in a high-power optical amplifier system. The method comprising: amplifying an optical signal from a seed signal at an input into an amplified signal at an output by driving a plurality of fiber amplifiers disposed along an optical path from the input to the output; detecting an operational parameter associated with the optical signal indicative of an onset of Stimulated Brillouin Scattering (SBS) on the optical path; and introducing, at the input of the optical path, an auxiliary broad-linewidth signal from a broad-linewidth source in response to the detection. As a result, the auxiliary broad-linewidth signal can mitigate the onset of SBS on the optical path.

A system disclosed herein is used to amplify a seed signal in an optical path. The system comprises: a plurality of fiber amplifiers, a broad-linewidth source, an input photodiode, and control circuitry. The fiber amplifiers are disposed in the optical path and are configured to amplify an optical signal from the seed signal at an input into an amplified signal at an output. The broad-linewidth source is disposed in optical communication with the input and is configured to selectively introduce an auxiliary broad-linewidth signal to the input. The input photodiode is disposed in optical communication with the input and is configured to detect the seed signal at the input.

The control circuity is in operational communication with the fiber amplifiers, the broad-linewidth source, and the input photodiode. The control circuity is configured to: drive the fiber amplifiers; detect an operational parameter associated with the optical signal indicative of an onset of Stimulated Brillouin Scattering (SBS) on the optical path; and introduce, at the input of the optical path, the auxiliary broad-linewidth signal from the broad-linewidth source in response to the detection. As a result, the auxiliary broad-linewidth signal can mitigate the onset of SBS on the optical path.

An apparatus disclosed herein comprises: at least one seed source providing at least one seed signal; a plurality of the system disclosed above, each amplifying the at least one seed signal and outputting an amplified signal; and a beam combiner combining the amplified signals as a combined output signal.

The foregoing summary is not intended to summarize each potential embodiment or every aspect of the present disclosure.

DETAILED DESCRIPTION OF THE DISCLOSURE

Figure 1:
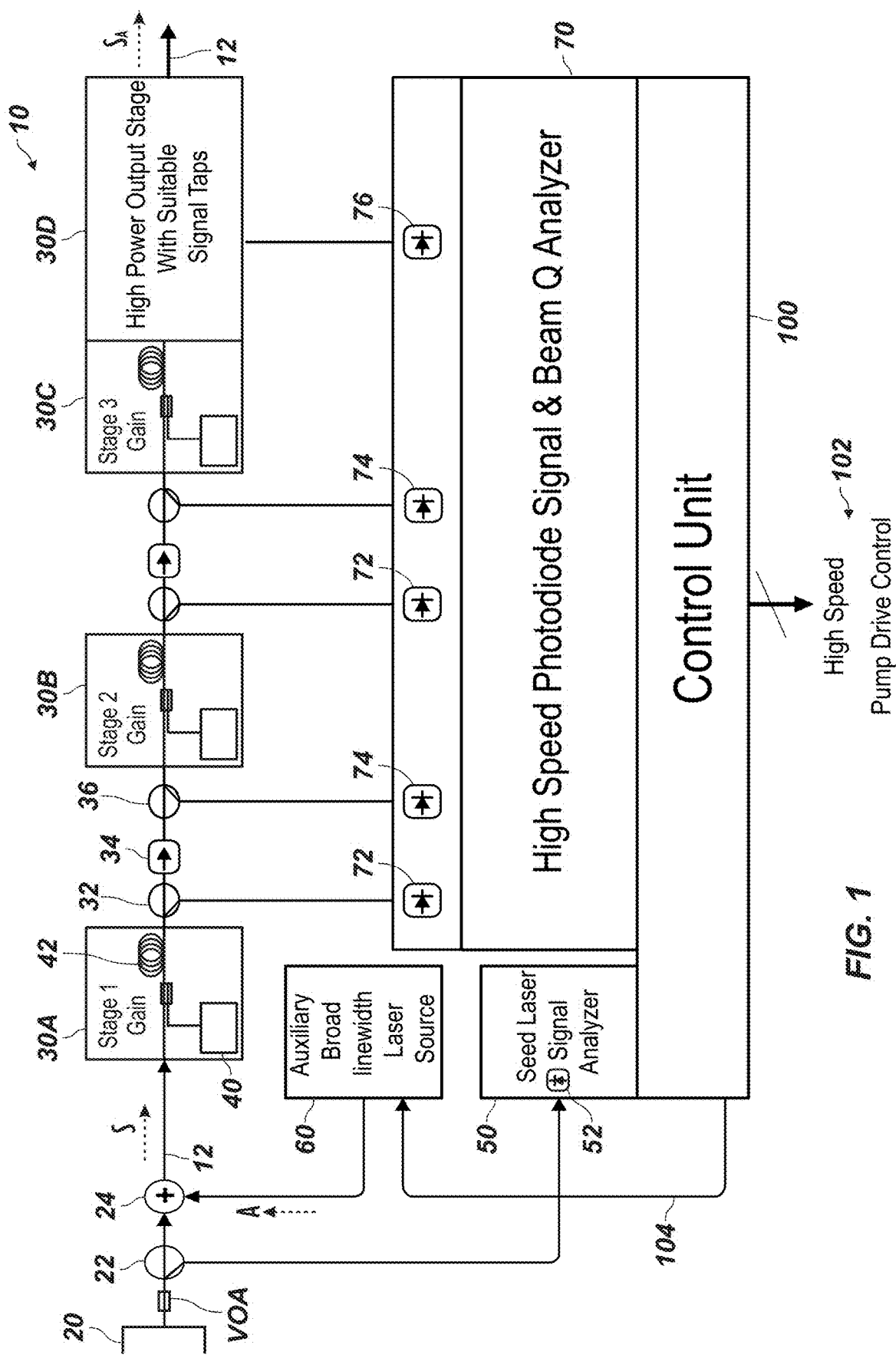
FIG. 1 illustrates a high power amplifier system having an arrangement to mitigate Stimulated Brillouin Scattering (SBS) according to the present disclosure.

FIG. 1 illustrates a high power amplifier system 10 having an arrangement to mitigate Stimulated Brillouin Scattering (SBS) according to the present disclosure. The high power amplifier system 10 includes an input 20 from a broadband seed source, which can include input from any suitable high-power optical source for the application at hand. A seed signal S from the seed input 20 passes along an optical path 12 of optical fiber and the like through a number of gain stages 30A-C, which include fiber amplifiers. For example, the fiber amplifiers of the stages 30A-C can each include a pump laser 40 having a laser diode and a pump drive to inject pump light into a doped fiber 42 at a given wavelength to excite ions in the dumped fiber 42. In turn, energy in the gain stages 30A-C is transferred to the seed signal S passing through the optical path 12 when the excited ions in the doped fiber 42 return to an unexcited state.

Ultimately, an amplified signal $S_A$ is output from the system's output stage 30D along the optical path 12. This amplified signal $S_A$ can then be used for the purposes of a particular implementation. As discussed below, for example, a directed energy system can use the amplified signal $S_A$ from this and other amplifier systems 10 to produce directed energy output.

As shown in this example, the optical topology has multiple gain stages 30A-C provided by the injections of the pump lasers 40 to doped fibers 42 to amplify the seed signal S to produce a final amplified signal $S_A$. In the present arrangement, three gain stages 30A-C are shown, but more or less can be used. In general, the gain stages 30A and 30B are helpful for providing gain, but the final output power of the amplifier system 10 from the final output stage 30D is almost entirely determined by the third gain stage 30C.

In the system 10, an auxiliary broad linewidth laser source 60 is added at the input of the amplifier system 10. As discussed in more detail below, this auxiliary source 60 can be used to prevent the onset of SBS in the event the seed signal S at the input 20 is detected to have an unacceptably narrow linewidth or if the onset of SBS is detected at the input of the final gain stage 30C.

For example, a forward optical tap 22 before the first gain stage 30A directs some of the input light from the seed signal S to a seed signal analyzer 50 ("seed analyzer"). As its name implied, the seed analyzer 50 analyzes the seed signal S from the seed source input 20. In general, the seed analyzer 50 includes any suitable photodiodes 52 and processing circuitry (not shown) to monitor information (i.e., power level, linewidth, wavelength, etc.) related to the seed signal S. The monitored information of particular relevance here relates to operational parameters associated with the seed signal S and/or the seed source (not shown) providing the signal S to the input 20 that may cause Stimulated Brillouin Scattering (SBS) to occur in the system 10 (or at least may cause the onset of SBS to occur).

Further along the optical path 12, a beam combiner 24 connects the auxiliary broad linewidth laser source 60 to the optical path 12. According to the techniques discussed below, the auxiliary source 60 introduces an auxiliary signal A in response to analysis by the seed analyzer 50 and any determination that the onset of SBS may occur by the control unit 100. This auxiliary source 60 can be any suitable light source, such as comparable to the seed signal S from the seed source at the input 20. Operation of the auxiliary source 60 is governed by the control system 100 as discussed below.

After the first gain stage 30A, the signal S passes a forward optical tap 32, an optical isolator 34, and a backward optical tap 36 before reaching the second gain stage 30B, where the signal is further amplified. The signal S then passes a similar arrangement of a forward optical tap 32, an optical isolator 34, and a backward optical tap 36 before reaching the third gain stage 30C, where the signal S is even further amplified. After the third gain stage 30C, the amplifier system 10 includes a high power output stage 40 with suitable signal taps (not shown). As shown, the optical isolators 34 can be used between gain stages 30A-C. These optical isolators 34 can use any suitable optical components to prevent or at least reduce back reflection and can be configured to the optical power, wavelengths, and other characteristics associated with the implementation.

To monitor the signal S as it is amplified and to monitor the output signal $S_A$ for the high-power beam produced by the amplifier system 10, a high speed photodiode signal and beam quality analyzer 70 ("quality analyzer") has arrangements of photodiodes 72, 74, 76 that receive signal light as the signal S is amplified at the gain stages 30A-C. As its name indicates, the quality analyzer 70 can monitor the multiple photodiodes 72, 74, 76 through high-speed signal process and can detect characteristics of the optical signal (wavelength, power, etc.) that characterize the quality of the beam produced.

To monitor the first gain stage 30A, for example, a first photodiode 72 connected to the forward tap 32 receives light from the signal S propagated from the first gain stage 30A, and a second photodiode 74 connected to the backward tap 36 receives any back-reflected signal from the second gain stage 30B. A similar arrangement of photodiodes 72, 74 can monitor the second gain stage 30B. Finally, one or more final photodiodes 76 of the quality analyzer 70 can receive light from the high power output signal $S_A$ at the output stage 30D for monitoring.

Figure 2:
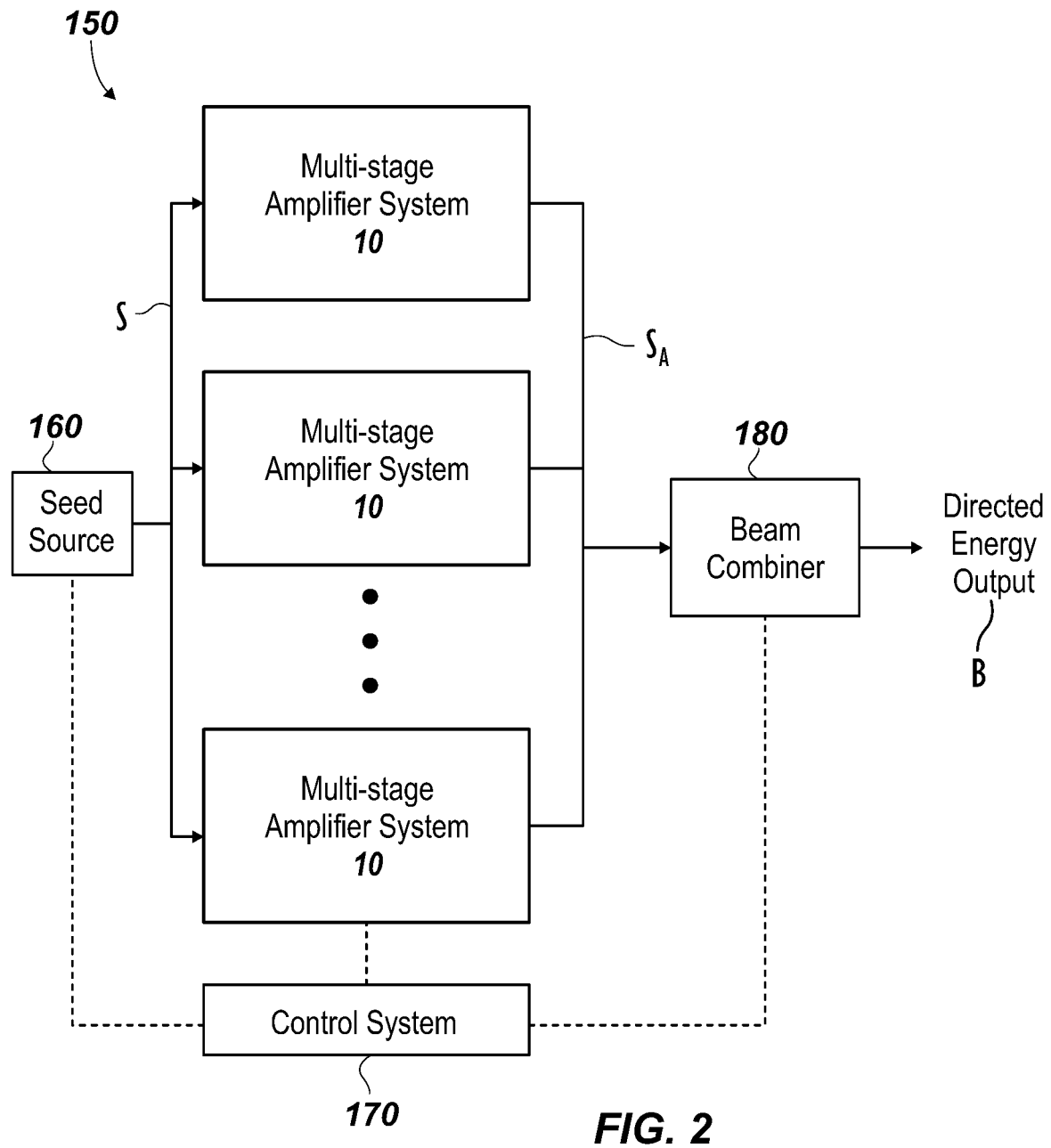
FIG. 2 illustrates a directed energy system having amplifier systems according to the present disclosure.

Although the stages 30A-C of each of the amplifier systems 10 are connected in series and add gain (and thus increase output power) of each system 10, a directed energy system may require higher output power than just one amplifier system 10 can produce. As shown in FIG. 2, for example, several of the multi-stage amplifier systems 10 of the present disclosure can be part of a larger directed energy system 150 that provides the seed signals S from a seed source 160 to the amplifier systems 10 and then combines the amplified signals $S_A$ output from the multiple amplifier systems 10 to a directed energy output beam B. As shown, the multiple amplifier systems 10 can be arranged in parallel and can have their amplified signals $S_A$ combined using a beam combiner 180, which can use either spectral or coherent beam combination.

In brief, the system 150 of FIG. 2 can be (i) a directed energy high power laser system used to concentrate laser beam power within a small area (commonly referred to as a focal spot or a target "hit-spot" area) to induce thermal and/or material modifications at a remotely located target; (ii) an industrial laser processing system that uses a high power laser energy source for material processing (cutting, welding, etc.) in metals; or other such high power system.

In general and as noted previously, the source of the seed signal S for the amplifier systems 10 may or may not be integrated components of these amplifier systems 10. As diagramed here, at least one independent seed source 160 is shown as part of the directed energy system 150 providing the seed signals S to the amplifier systems 10. As also diagramed here, the directed energy system 150 may include a control system 170 capable of monitoring and controlling the seed source 160, the amplifier systems 10, the beam combiner 180, and other components. The seed source 160, the control system 170, and the combiner 180 can be based on any of a number of configurations used in directed energy systems. If practical, functions of the control units (100) in the amplifier systems 10 can be part of or integrated into this control system 170.

In general, the beam combiner 180 combines the amplified signals $S_A$ to produce the directed energy output beam B. The combiner 180 is expected to combine the separate amplified signals $S_A$ to produce a higher power output that preserves the beam qualities. To do the combining, the beam combiner 180 can use spectral beam combination or coherent beam combination.

In spectral beam combination (e.g., wavelength or incoherent beam combining), the amplified signals $S_A$ have optical spectra that does not overlap, and the combiner 180 uses wavelength-sensitive components to direct the amplified signals $S_A$ according to their respective wavelengths. The combiner 180 can thereby spatially overlay the amplified signals $S_A$ at their specific wavelengths into a single beam output beam B, which has the spectral content covering the bandwidth range of the amplified signals $S_A$.

In the spectral beam combination, the wavelengths of the seed signals S provided to each of the amplifier systems 10 will be different. Therefore, the wavelength for the auxiliary source 60 in each of the amplifier systems 10 is preferably tunable and set to match that of the primary seed signal S that the particular amplifier system 10 receives. The information to tune and set the wavelength of the auxiliary source 60 for the particular amplifier system 10 can be input manually by an operator. Preferably, however, each amplifier system 10 is configured to determine the appropriate wavelength for its auxiliary source 60 to match the wavelength of the seed signal S provided to the amplifier system 10. Appropriate detection systems (not shown) can handle this operation automatically.

In coherent beam combination, the amplified signals $S_A$ being combined will have mutual coherence, which may need to be controlled to remove amplifier noise, to provide phase adjustments, to handle drift, and the like. The combiner 180 in this case can use beam splitters, optical couplers, a coherent fiber array, side-by-side combining, filled-aperture combining, and the like. For this configuration, the direct energy system 150 can use various known components and techniques, such as those related to fiber array laser heads, Master Oscillator Power Amplification (MOPA), phase-locking architecture, and the like for parallel amplification of the seed signal S (from one seed source 160) in the multiple amplifier systems 10.

Additionally, in the coherent beam combination, the wavelength of the auxiliary source 60 should be very close to the wavelength of the primary seed signal S. Moreover, the seed signal S input to the amplifier systems 10 may be purposely narrow in linewidth to allow for long coherence lengths and the ultimate combinability and tolerance to path length differences in the individual amplifier systems 10. The seed signal S input to each amplifier system 10 can be individually broadened in a deterministic way using, for example, a pseudorandom binary sequence (PRBS) modulation scheme. In this way, any physical path length differences can be compensated by electronically controlled delays within this modulation scheme. These and other features can be part of the control system 170 for the directed energy system 150.

As noted, SBS is a non-linear effect in high power amplifiers/lasers that can lead to catastrophic damage. Effective mitigation of SBS in the event of an inadequate seed signal S injected into the core of the fiber amplifiers of the amplifier systems 10 as disclosed herein can make the systems 10 much more robust to non-ideal installation and operating conditions and failures of the seed broadening. This will also improve manufacturability and simplify testability.

As hinted to above in the amplifiers system 10 of FIG. 1, the seed analyzer 50 and the quality analyzer 70 are used by the control unit 100 to control the drive of the pump lasers 40 of the gain stages 30A-C to achieve the desired amplification, but to also mitigate SBS as disclosed herein.

Figure 3:
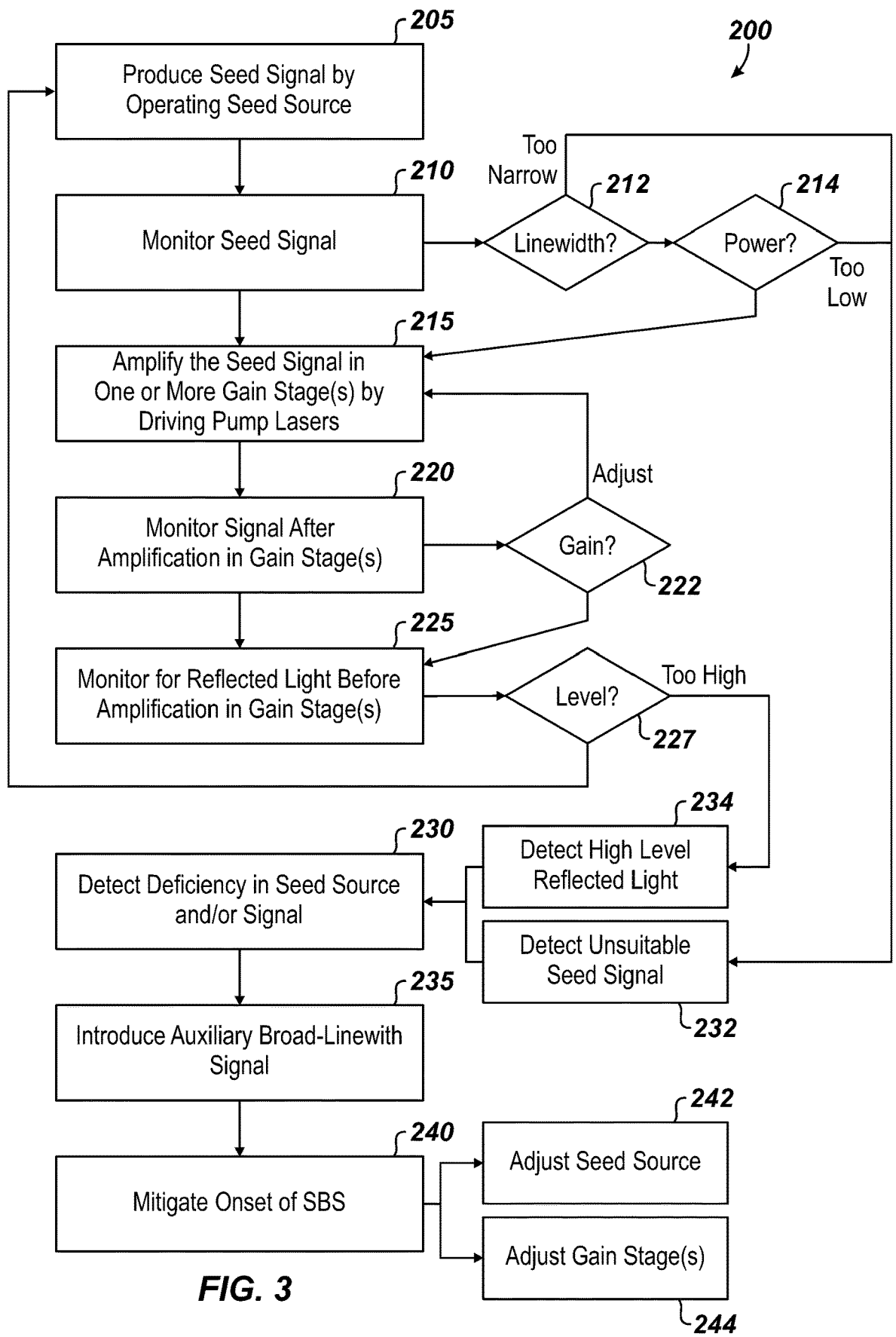
FIG. 3 illustrates a method of mitigating SBS in a high-power amplifier system of the present disclosure.

Turning then to FIG. 3, a process 200 of operating the high power amplifier system 10 according to the present disclosure is shown in flow chart form. For explanation, references is made to the elements of the amplifier system 10 depicted in FIG. 1 as well as the directed energy system 150 of FIG. 2. The process 200 includes steps for normal operation of the systems 10/150 as well as steps for detecting and mitigating the onset of SBS.

During operation, the seed signal is produced by operating a seed source according to the required operating parameters for the implementation at hand (Block 205). As noted, a seed source 160 as in FIG. 2 may be part of a larger directed energy system 150 and may be controlled by a corresponding control system 170. With respect to the amplifier system 10 of FIG. 1, such a seed source 160 may be a separate sub-system and may not actually be part of the amplifier system 10 with its auxiliary source 60. In that sense, the seed signal is simply received at the amplifier system's input 20 as a pure optical signal subject to separate control.

In another configuration, of course, the amplifier system 10 may incorporate the seed source (160) that provide its seed signal, and/or functions of the amplifier system's control unit 100 can be configured to also control the seed source (160) or to operate in conjunction with the directed energy control system (170) that controls the seed source (160). In any event, for the purposes of discussion, any one or more of the seed analyzer 50, quality analyzer 70, control unit 100, control system (160), and other processing and control elements disclosed here can constitute "control circuitry" in the present disclosure.

To protect the amplifier systems 10 from a broadening failure of the seed source 160, the seed signal S of the seed source 160 has to be high enough in power and broad enough in linewidth to avoid SBS issues. Using the tapped light of the seed signal S in FIG. 1 from optical tap 22, the seed analyzer 50 monitors the seed signal S (Block 210). In particular, the seed analyzer 50 samples the input seed signal S for linewidth (212) and power level (214). When needed to mitigate SBS, the power level information is used by the control unit 100 to adjust the power of the auxiliary broad linewidth source 50 for fast gain clamping and to adjust pump currents (and thus power) based on feedforward control algorithms for next level gain clamping.

As the seed signal S in FIG. 1 passes along the optical path 12 of the amplifier system 10, the seed signal S is amplified in the one or more gains stages 30A-C by driving the various pump lasers 40 (Block 215). In some directed energy laser systems (including spectrally-combined amplifiers), the operating point of each amplifier 42 needs to be backed off from maximum in order to stay under the SBS threshold. With the SBS mitigation techniques disclosed herein, however, the amplifier system 10 can be operated with the normal level of each amplifier in the gain stages 30A-C.

For practical purposes, SBS may realistically only a problem in the final gain stage 30C of the amplifier system 10. In the larger system 150 of FIG. 2 having many of the amplifier systems 10, each of the amplifier systems 10 can be operated closer to the SBS limit, giving a higher overall combined power. The mitigation techniques will protect the amplifier systems 10 should they pass through worst case parameters. In the larger system 150 of FIG. 2 having many parallel amplifier systems 10, this could provide a substantial gain in overall output.

To monitor the amplification of each gain stage 30A-C in the amplifier system 10 of FIG. 1, the forward tap 32 directs some light of the signal S to a photodiode 72 of the quality analyzer 70, which monitors the signal after amplification in the respective gain stage 30A-C (Block 220). For example, in monitoring the signal after amplification (Block 220), the quality analyzer 70 can determine whether the gain needs to be adjusted or not (Decision 222). Then, detected parameters of the amplified signal can be used by the control unit 100 to change the high-speed pump drive controls 102 communicated to the drives for the pump lasers 40 in the gain stages 30A-C.

In further monitoring, the backward tap 32 directs reflected light of the optical signal on the path 12 to another photodiode 74 of the quality analyzer 70, which monitors the reflected signal in the optical path 12 (Block 225). (As noted, a final stage photodiode 76 can monitor the amplified signal to be output for the laser beam from the system 10.)

During operation, the control unit 100 operates in conjunction with the seed analyzer 50 and the quality analyzer 70 to detect deficiency in the seed source and/or in the seed signal (Block 230). The detected deficiency preemptively triggers the introduction of the auxiliary signal A of the auxiliary broad linewidth source 60 (Block 235).

For example, in monitoring the seed signal S (Block 210), the seed analyzer 50 samples the input seed signal S to determine if the linewidth is too narrow (Decision 212) or if the power level is too low (Decision 214). (Although not shown, the seed analyzer 50 can determine if both circumstances apply.) If neither apply, normal operation can continue.

However, based on the analysis, the auxiliary signal A from the auxiliary broad linewidth source 60 may be introduced into the amplifier's input at the combiner 24 (Block 235) when the existing seed signal S at the input 20 is detected to be unsuitable (Block 232), either because the seed signal S from the seed source (160) is too narrow or too low in power. The linewidth measurement of the seed signal S in the seed analyzer 50 is used to determine the appropriate power level of the auxiliary broad linewidth source 60 so as to prevent SBS caused by the (inappropriately) narrow or low power seed signal S of the seed source (160).

In another example, in monitoring reflected light (Block 225), the quality analyzer 70 can determine whether the level of the reflected light is too high, exceeding a given threshold for the implementation (Decision 227). If not, normal operation can continue. However, in response to high levels of backward (reflected) light (spikes) being detected at the input of a gain stage 30A-C created by the nonlinear SBS (Block 234), the auxiliary signal A from the broad linewidth source 60 may be introduced into the amplifier's input at the combiner 24 (Block 230). As noted, the photodiodes 74 of the quality analyzer 70 receiving backward (reflected) light can be analyzed to determine if levels of the backward light are too high and are indicative of spikes created by the nonlinear SBS along the optical path 12.

In response to the detected deficiency (Block 230), the control unit 100 introduces the auxiliary broad linewidth signal A into the optical path 12 by an activation signal 104 to the auxiliary source 60 (Block 235). The control unit 100 continues to mitigate the onset of SBS as long as the mitigation is needed or the deficiency is detected in the system 10 (Block 234).

When the auxiliary signal A from the auxiliary broadband laser source 60 is added, for example, the output power of the amplifier system (resulting from seed signal S at the input 20 experiencing narrow linewidth or low power) is compensated (by the ratio of the seed signal S to the auxiliary signal A) (Block 242). In this way, the auxiliary broad-linewidth source 60 (at very nearly the same wavelength as the seed signal S) acts effectively as a very fast gain adjustment for the seed signal S. This fast gain adjustment can be used to drop the amplified seed signal's output below the SBS threshold before damage is done and substantially more quickly than by adjustment of the pumps of the gain stages 30A-C can be achieved alone. Should it be feasible, the gain stages 30A-C can be adjusted to supplement or supplant the output of the auxiliary broadband laser source 60 (Block 244).

Whatever had caused the instability may be rectified by other processes in the system 10 or may resolve over time on its own. Nevertheless, the introduction of the auxiliary signal A may no longer be needed to mitigate the onset of SBS, and normal operation may be resumed once the seed source signal S at the input 20 is suitable (i.e., the seed source 160 is capable of providing a suitable seed signal S to the system 10).

In summary, the process 200 of the present disclosure mitigates the onset of SBS by introducing the auxiliary broad linewidth signal A from the built-in "auxiliary" broad linewidth source 60 into the amplifier system's input. The auxiliary signal A from this broad linewidth source 60 is introduced in cases where the initial, lower power, broadband seed signal S is either lost or not operating with sufficient linewidth and/or power.

Initially as noted previously, the system 10 is protected from a broadening failure of the seed source (160) at the input 20 because the power level of the broad source (160) is made high enough to reduce the power of the amplified seed signal S to below the SBS threshold. The addition of the auxiliary broad linewidth source 60 as disclosed herein naturally drives down the gain that the seed signal S will experience by roughly the ratio of the auxiliary signal's power to the seed signal S at the insertion point. This functionality can be further improved by having a variable optical attenuator (VOA) on the signal path 12 prior to the addition of the auxiliary signals A from the broad linewidth source 60. Such a variable optical attenuator may be controlled by the control unit 100 and used to actively reduce the power of the narrow band seed source (160).

The addition of the large-bandwidth source 60 allows fast gain reduction of the seed signal S as soon as a narrow linewidth signal is detected at the input or as soon as SBS is detected near the final gain stage 30C. This does not require operation of the pump lasers 40 to be changed quickly and does not require the energy stored in the coils of the amplifiers 42 to bleed down. The fast SBS suppression using the broad linewidth source 60 can use a self-heterodyne mixer for sub-microsecond detection and ultra-fast laser enable. The timescales that limit this process are propagation times of light through fiber time, time to detect bandwidth, and time to turn-on the drive of the auxiliary source, rather than times to turn-off high-power pumps, lifetimes of atomic excited states in the amplifiers, and any time period for the system's optical power to drain down.

As an aside, the built-in "auxiliary" broad source 60 can also serve as an input for the laser during manufacture and testing. In particular, the system 10 has an additional laser in a unit in the form of the wide bandwidth source 60, which can be used for testing during manufacture. No external source would therefore be required.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A method for mitigating Stimulated Brillouin Scattering (SBS) in a high-power optical amplifier system, the method comprising:
   amplifying an optical signal from a seed signal at an input into an amplified signal at an output by driving a plurality of fiber amplifiers disposed along an optical path from the input to the output;
   detecting an operational parameter associated with the optical signal indicative of an onset of Stimulated Brillouin Scattering (SBS) on the optical path; and
   introducing, at the input of the optical path, an auxiliary broad-linewidth signal from a broad-linewidth source in response to the detection.

2. The method of claim 1, wherein detecting the operational parameter associated with the optical signal indicative of the onset of SBS on the optical path comprises:
   monitoring linewidth of the seed signal at the input; and
   determining that the linewidth of the monitored seed signal is narrower than a linewidth threshold.

3. The method of claim 2, wherein introducing the auxiliary broad-linewidth signal comprises determining, based on the monitored linewidth, power of the auxiliary broad-linewidth signal configured to mitigate the onset of SBS.

4. The method of claim 1, wherein detecting the operational parameter associated with the optical signal indicative of the onset of SBS on the optical path comprises:

monitoring power of the seed signal at the input; and
determining that the power of the monitored seed signal is below a power threshold.

5. The method of claim 1, further comprising:
detecting amplification of the optical signal propagated from of the fiber amplifiers; and
driving the respective fiber amplifier based on the detected amplification.

6. The method of claim 1, wherein detecting the operational parameter and introducing the auxiliary broad-linewidth signal comprises:
detecting back reflection on the optical path;
determining that the detected back reflection exceeds a threshold; and
introducing the auxiliary broad-linewidth signal based on the determination.

7. The method of claim 6, wherein detecting the back reflection on the optical path comprises detecting downstream of one of the fiber amplifiers and optically isolated from other of the fiber amplifiers.

8. The method of claim 1, wherein mitigating the onset of SBS on the optical path using the auxiliary broad linewidth signal comprises adjusting output power of the seed signal by a ratio relative to the auxiliary broad linewidth signal introduced.

9. The method of claim 8, wherein adjusting the output power of the seed signal is followed by adjusting the driving of one or more of the fiber amplifiers.

10. The method of claim 8, wherein adjusting the output power of the seed signal comprises actively attenuating the seed signal using a variable optical attenuator upstream of the insertion of the auxiliary broad linewidth signals from the broad linewidth source.

11. The method of claim 1, comprising:
initially receiving the seed signal at the input without actively operating the seed source; or
providing the seed signal at the input by actively operating the seed source.

12. The method of claim 1, wherein amplifying the optical signal from the seed signal at the input into the amplified signal at the output comprises performing the amplification with multiple amplifier systems in parallel producing a plurality of the amplified signal; and wherein the method further comprises combining the amplified signals as a combined output signal.

13. The method of claim 12, wherein combining the amplified signals as the combined output signal comprises using spectral beam combination or coherent beam combination.

14. A system to amplify a seed signal in an optical path, the system comprising:
a plurality of fiber amplifiers disposed in the optical path and configured to amplify an optical signal from the seed signal at an input into an amplified signal at an output;
a broad-linewidth source disposed in optical communication with the input and being configured to selectively introduce an auxiliary broad-linewidth signal to the input;
an input photodiode disposed in optical communication with the input and being configured to detect the seed signal at the input; and
control circuitry in operational communication with the fiber amplifiers, the broad-linewidth source, and the input photodiode, the control circuitry configured to:
drive the fiber amplifiers;
detect an operational parameter associated with the optical signal indicative of an onset of Stimulated Brillouin Scattering (SBS) on the optical path; and
introduce, at the input of the optical path, the auxiliary broad-linewidth signal from the broad-linewidth source in response to the detection.

15. The system of claim 14, wherein to detect the operational parameter, the control circuitry is configured to:
monitor linewidth of the seed signal at the input; and
determine that the linewidth of the monitored seed signal is narrower than a linewidth threshold.

16. The system of claim 15, wherein to introduce the auxiliary broad-linewidth signal, the control circuitry is configured to determine, based on the monitored linewidth, power of the auxiliary broad-linewidth signal configured to mitigate the onset of SBS.

17. The system of claim 14, wherein to detect the operational parameter, the control circuitry is configured to:
monitor power of the seed signal at the input; and
determine that the power of the monitored seed signal is below a power threshold.

18. The system of claim 14, further comprising a plurality of signal photodiodes each disposed downstream of a respective one of the fiber amplifiers, each of the signal photodiodes configured to detect the optical signal propagated from the respective fiber amplifier, wherein the control circuitry is in operational communication with the signal photodiodes and is configured to:
detect amplification of the optical signal; and
drive the respective fiber amplifier based on the detected amplification.

19. The system of claim 14, further comprising a plurality of photodiodes each disposed upstream of a respective one of the fiber amplifiers, each of the photodiodes configured to detect back reflection on the optical path, wherein the control circuitry is in operational communication with the photodiodes and is configured to:
determine that the detected back reflection exceeds a threshold; and
introduce the auxiliary broad-linewidth signal based on the determination.

20. The system of claim 14, wherein to mitigate the onset of SBS on the optical path using the auxiliary broad-linewidth signal, the control circuitry is configured to adjust output power of the seed signal by a ratio relative to the auxiliary broadband laser signal introduced.

21. The system of claim 20, wherein to adjust the output power of the seed signal, the control circuitry is configured to adjust the drive of one or more of the fiber amplifiers.

22. The system of claim 20, wherein to adjust the output power of the seed signal, the control circuitry is configured to actively attenuate the seed signal using a variable optical attenuator upstream of the insertion of the auxiliary signals from the broad linewidth source.

23. An apparatus, comprising:
at least one seed source providing at least one seed signal;
a plurality of the system according to claim 14, each amplifying the at least one seed signal and outputting an amplified signal; and
a beam combiner combining the amplified signals as a combined output signal.

* * * * *